United States Patent
Jenkins, IV

(10) Patent No.: US 7,574,240 B1
(45) Date of Patent: Aug. 11, 2009

(54) POWER ESTIMATION FOR MOBILE DEVICES

(75) Inventor: Jesse H. Jenkins, IV, Danville, CA (US)

(73) Assignee: XILINX, Inc., San Jose, CA (US)

( * ) Notice: Subject to any disclaimer, the term of this patent is extended or adjusted under 35 U.S.C. 154(b) by 490 days.

(21) Appl. No.: 11/128,773

(22) Filed: May 13, 2005

(51) Int. Cl.
*H04M 1/00* (2006.01)

(52) U.S. Cl. ............... 455/574; 455/452.2; 370/338

(58) Field of Classification Search ............ 455/412.1, 455/414.1, 451, 452.1, 452.2, 572, 574; 370/311, 370/328, 338
See application file for complete search history.

(56) References Cited

U.S. PATENT DOCUMENTS

| | | | |
|---|---|---|---|
| 6,463,042 B1 * | 10/2002 | Paatelma | 370/318 |
| 6,501,949 B1 | 12/2002 | Singleton | |
| 6,816,719 B1 | 11/2004 | Heinonen et al. | |
| 7,257,407 B2 * | 8/2007 | Dacosta et al. | 455/452.1 |
| 2003/0028612 A1 * | 2/2003 | Lin et al. | 709/217 |
| 2004/0002367 A1 * | 1/2004 | Chanut | 455/574 |
| 2004/0092282 A1 * | 5/2004 | Kim et al. | 455/522 |
| 2004/0185913 A1 * | 9/2004 | Aoshima et al. | 455/566 |
| 2005/0048960 A1 * | 3/2005 | Yamauchi et al. | 455/418 |
| 2005/0250531 A1 * | 11/2005 | Takebe et al. | 455/550.1 |
| 2005/0265345 A1 * | 12/2005 | Chen et al. | 370/392 |
| 2006/0064386 A1 * | 3/2006 | Marking | 705/59 |
| 2006/0264197 A1 * | 11/2006 | Mahini et al. | 455/343.5 |

* cited by examiner

*Primary Examiner*—Nhan T Le
(74) *Attorney, Agent, or Firm*—W. Eric Webostad; Justin Liu

(57) ABSTRACT

Method for power estimation for mobile devices for content downloading is described. More particularly, likelihood of download success is determined responsive to user selection of downloadable content after establishment of a connection between a mobile device and a network. Capabilities of the mobile device are obtained. The power level of the mobile device is obtained. At least one download data rate is determined. A likelihood of success for downloading the downloadable content selected responsive to the at least one download data rate, the power level of the mobile device, and at least one capability from the capabilities of the mobile device is determined.

14 Claims, 3 Drawing Sheets

POWER ESTIMATION FOR MOBILE DEVICES

FIELD OF THE INVENTION

One or more aspects of the invention relate generally to communications and, more particularly, to power estimation for mobile devices for content downloading.

BACKGROUND OF THE INVENTION

Mobile electronic devices are becoming ever more popular. Examples of such mobile devices include notebook computers, wireless telephones, and personal data assistants ("PDAs"). A more recent development is known as a "smartphone." A smartphone is generally any handheld device that integrates personal information management and mobile phone capabilities in the same mobile device. Adding phone functionality to a PDA configured for wireless communication or putting "smart" capabilities, such as PDA functions, into a mobile phone are examples of smartphones.

Another burgeoning market is downloadable multimedia content from a network, such as the Internet. Examples of downloadable content include real-time music, video surveillance, audiobooks, television channels, motion pictures, video clips, and the like. As is known, some downloadable content may be compressed for transmission to conserve bandwidth. Moreover, some downloadable content may be encrypted for reasons of security or to mitigate against copyright infringement. Furthermore, downloadable content may be in a particular format, such as JPEG, MPEG, MP3, TIF, GIF, AVI, and i-Tunes compression, among other known forms of data encoding or compression. Data may also be encoded for purposes of error detection and/or correction when resolving a signal, including turbo encoding, Viterbi encoding, Hamming encoding, and other known forms of signal error detection/correction.

In order to receive and provide to a user either or both a visual or audio representation of downloadable content, a mobile device may have to decrypt, decode, or decompress, or any combination thereof, such downloadable content. Moreover, when a mobile device establishes connectivity to a network in order to access such downloadable content, power is consumed. It should be understood that power is consumed for processing of the downloadable content, as well as for network access including without limitation receiving a downloadable content transmission. Notably, as used herein, the words "include" and "including" shall mean include or including without limitation.

When not plugged into an outlet, mobile devices are limited by the extent of their battery power. Thus, a user may initiate a download of downloadable content, but due to lack of sustained battery power, such download may be interrupted. The interruption of the download of downloadable content may render the download worthless, or at least be an unwanted interruption. This is especially true for content that is purchased for download. For example, a song or a movie that is provided via a streaming download may not have been purchased by a user if the user had known that the download would not go to completion due to battery power depletion.

Accordingly, it would be desirable and useful to provide means to determine whether a download of downloadable content is more or less likely to be completed for a mobile device prior to initiating such download.

SUMMARY OF THE INVENTION

One or more aspects of the invention generally relate to communications and, more particularly, to power estimation for mobile devices for content downloading.

An aspect of invention is a method for determining likelihood of download success responsive to user selection of downloadable content after establishment of a connection between a mobile device and a network. Capabilities of the mobile device are obtained. The power level of the mobile device is obtained. At least one download data rate is determined. A likelihood of success for downloading the downloadable content selected responsive to the at least one download data rate, the power level of the mobile device, and at least one capability from the capabilities of the mobile device is determined.

Another aspect of the invention is a method for downloading downloadable content from a network to a mobile device. Content to be downloaded is selected. Battery information from the mobile device is obtained. The battery information is associated with a battery of the mobile device. Responsive in part to the battery information, a probability of completing a download of the content selected prior to insufficient power remaining in the battery is determined. The probability is associated with a quality of service level. The probability for the quality of service level is sent to the mobile device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
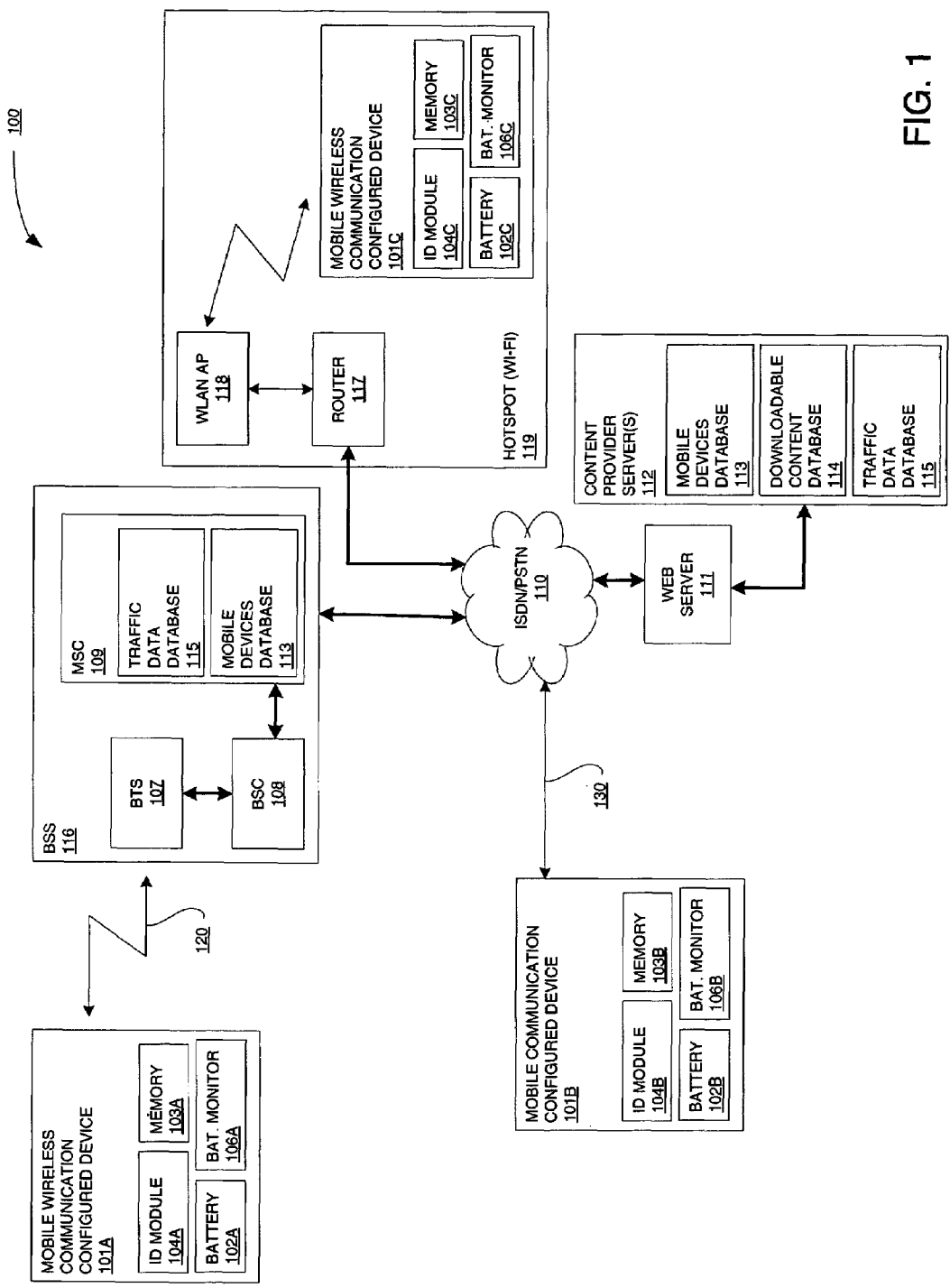
FIG. 1 is a high-level block/network diagram depicting an exemplary embodiment of a communications network.

FIG. 1 is a high-level block/network diagram depicting an exemplary embodiment of communications network 100. Communications network 100 may include one or more mobile wireless communication configured devices, such mobile wireless communication configured device 101A. Mobile wireless communication configured device ("mobile device") 101A may be any of the above-identified mobile devices configured for wireless communication. For example, with respect to a wireless phone, a personal computer having a wireless radio card, or a PDA configured for wireless communication being mobile device 101A, each may include a battery 102 and battery monitor 106. Additionally, each of such mobile devices may include memory 103. With respect to wireless phones, including smartphones, each may include an identification ("ID") module 104. Notably, in FIG. 1, mobile devices 101A through 101C each have a battery, memory, ID module, and battery monitor 106, which are referenced by numbers 102, 103, 104, and 106 respectively, with either an A, B, or C corresponding the reference number of the respective mobile device. However, for purposes of clarity, the A, B, or C is dropped in those instances where the description may apply to the other mobile devices.

Mobile device 101A may be put in communication with a Base Station Subsystem ("BSS") 116 via an over-the-air connection 120. Notably, though a Groupe Speciale Mobile ("GSM," i.e., global system for mobile communication) is illustratively described herein, it should be understood that another type of digital wireless phone network may be used, including code division multiple access ("CDMA") based network instead of a time division multiple access ("TDMA") based network. BSS 116 may include a Base Transceiver Station ("BTS") 107 for the over-the-air connection 120. BTS 107 may be wired to a Base Station Controller ("BSC") 108. BSC 108 may be wired to a Mobile Switching Center ("MSC") 109. MSC 109 may be used to handle mobile subscriber communications, including registration, authentication, location updating, handovers, and call routing to roaming subscribers. MSC 109 may request of mobile device 101A a International Mobile Equipment Identity ("IMEI").

The IMEI of mobile device 101A may be stored in ID module 104. Thus, MSC 109 may include a mobile devices database 113 associated with IMEIs of mobile devices. Additionally, MSC 109 may maintain a database of ongoing traffic data, namely traffic data database 115. Traffic data database 115 may be used to determine current available bandwidth by knowing what amount of bandwidth is presently being used, as well as location of mobile devices. With respect to the latter, it should be appreciated that climatological information may be associated with a location. Notably, temperature may affect battery usage. Accordingly, an operating temperature may be requested responsive to a user being in an extreme temperature range, either hot or cold, whether inside or outside. This temperature input may be provided by a user to a content provider via the Internet.

BSS 116 may be wired to an integrated services digital network or public switch telephone network, or some combination thereof ("ISDN/PSTN") 110 for access to the Internet, for example. Notably, Internet Service Providers ("ISPs"), which may be included as part of ISDN/PSTN 110, are not shown for purposes of clarity. A web server 111 may be used as a front-end to content provider servers 112 for coupling to network 110. Content provider servers 112 may include downloadable content database 114 which may be accessed via mobile device 101A for storage in memory 103. Accordingly, it will be useful to know whether memory 103 is sufficient for storing selected downloadable content from downloadable content database 114. Thus, mobile device 101A may communicate current memory availability to web server 111 for processing. Additionally, content provider servers 112 may mirror traffic data database 115 and mobile devices database 113. Thus, an indication of remaining battery power via battery monitor 106, available memory of memory 103, and IMEI information from ID module 104 may be communicated to a content provider such as via web server 111 over network 110 through BSS 116.

IMEI information includes manufacturer name and model number of mobile device 101A. Thus, it may be ascertained from IMEI information what capabilities mobile device 101A includes. Such capabilities may relate to types of decompression, decryption, or decoding or any combination of two or more of these. Other IMEI information may include the date/place of manufacture, listed battery capacity, and transceiver voltage levels. Moreover, for a mobile device 101A having resident battery processing intelligence, it may be determined what particular type of battery is being used and its associated performance characteristics. For example, some batteries may have a decrease in power capability which gradually degrades via a more sloped line towards zero power than other types of batteries. Other types of batteries may maintain within some range a generally flat power level and then abruptly decline to zero power. Thus, the two types of battery performance profiles may be thought of as a sawtooth wave in contrast to a step function.

Transmission of a measurement report from mobile device 101A to BSS 116 may include signal strength information and Bit Error Rate ("BER") information. These measurement reports are used in wireless communication networks to report details of a radio environment to BSS 116. Transmission link measurements, as well as locating algorithms, are used by BSS 116 to determine when it is suitable to "hand over" mobile device 101A to another BSS or to a new time slot resource to facilitate continuance of a call with an opportunity of improved signal strength or BER, or a combination thereof. This measurement report may be appended to include a current power source capacity level of mobile device 101A. This measurement report may indicate the origination and type of the power source, namely the origination and type of battery 102. Notably, a measurement report may be separately transmitted as a self-contained signal. Additional details regarding a measurement report may be found in U.S. Pat. No. 6,501,949 B1, which is herein incorporated by reference.

It should be understood that there are many factors influencing the efficiency of battery 102, including age, discharge rate, temperature, and usage, among other factors. Moreover, battery 102 may have to maintain a threshold level of power to insure service at a sufficient level of quality. Though the term "battery" has been referenced as a power source, it should be understood that battery as used herein may include a power cell, battery pack, solar cell, or other portable power supply.

Notably, it has been assumed that mobile device 101A is operating in a wide area network ("WAN") environment. Moreover, it has been assumed that this is a wireless WAN. However, as illustratively shown, a mobile communication configured device 101B may be coupled to ISDN/PSTN 110 via a dial-up connection 130. Accordingly, mobile communication configured device 101B may be configured with a modem for such dial-up connectivity. Furthermore, a mobile wireless communication configured device 101C may be configured with a wireless local area network ("WLAN") card for communication with a WLAN access point ("AP") 118. WLAN AP 118 may be wired to a router 117, and router 117 may be coupled to network 110. This configuration of one or more mobile devices 101C in communication in the form of a WLAN is sometimes referred to as a "hotspot" or "Wi-Fi" 119. Notably, for a mobile device, such as mobile communication configured device 101B, not being a phone, but being a personal computer, there may be an ID module 104B having the same type of information that is conventionally associated with a subscriber identity module of a mobile phone. Furthermore, it should be appreciated that a more recent trend is to have personal computers configured for Voice Over Internet Protocol ("VoIP") for use as telephonic devices.

Accordingly, it should be understood that a variety of mobile devices may be used in communication network 100. Information that may be used to determine whether or not such a mobile device has sufficient battery power to complete a download of selected downloadable content may be obtained as being associated with communication to any of these above-mentioned types of mobile devices.

Moreover, it should be understood that operational modes or parameters defined by an operational mode, such as ring tone level, volume, back lighting, and other modes may affect power consumption of a mobile device. These operational modes may be communicated to determine power consumption and, more particularly, to determine if given such operational modes, whether affected downloadable content may be uninterruptedly downloaded. Additional details regarding such operational parameters testable via a network are described in U.S. Pat. No. 6,816,719 B1, which is herein incorporated by reference.

Notably, it is well known that BSS 116 may allocate increased power or reduced power in a transmission to mobile device 101A via over-the-air connection 120. While power level increases or decreases conventionally affect BER, they may also impact battery usage for resolving a download of selected downloadable content. Accordingly, allocated or likely allocated transmission power level from BSS 116 to mobile device 101A may be a factor to be considered as part of operation 206 of FIG. 2; however, such factor does not conventionally apply to power consumption of mobile devices 101B and 101C.

Figure 2:
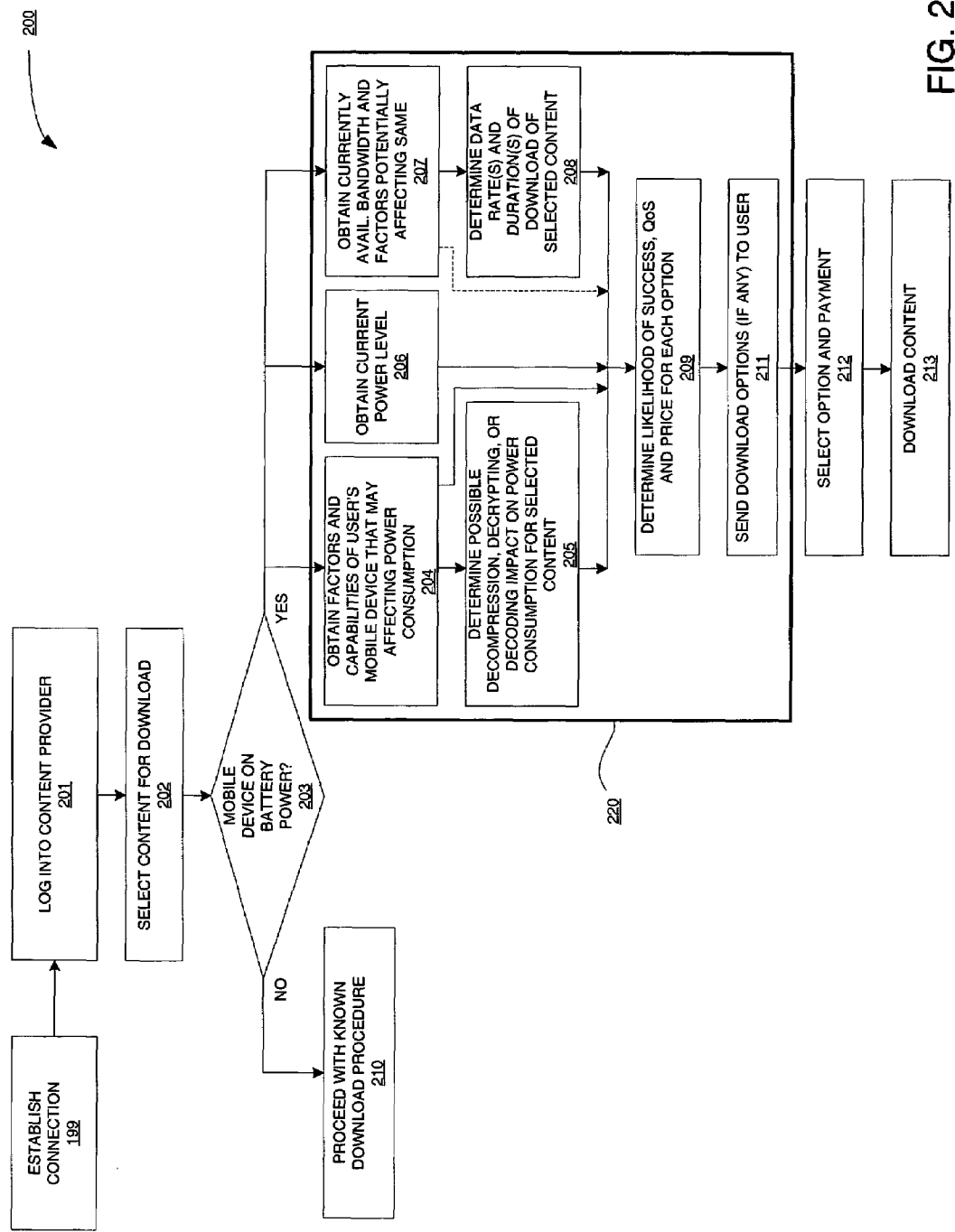
FIG. 2 is a flow diagram depicting an exemplary embodiment of a power consumption estimation for download flow.

FIG. 2 is a flow diagram depicting an exemplary embodiment of a power consumption estimation for download flow 200. At 199, a mobile device establishes a connection to a network, such as in communication network 100 as previously described. At 201, a user logs into a content provider. Notably, it has been assumed that service is provided via a web interface. Thus logging into a content provider may simply mean accessing a website of a content provider, or it may be more involved, such as in establishing a secure sockets layer ("SSL") session.

At 202, a user selects content provided via the content provider for download. At 203, it is determined whether the user is using a mobile device on battery power. If the mobile device is not currently on battery power, the download may proceed at 210 in a known manner for a non-battery-powered download. If, however, the mobile device is on battery power, then a power estimation routine 220 is invoked. Power estimation routine 220 may include operations 204 through 208, which may be done sequentially or in parallel. For purposes of clarity, operations are shown as being done in parallel, though they may be done sequentially.

At 204, the mobile device's factors and capabilities that can affect power consumption are obtained. Such factors may include one or more of: the operating mode of the mobile device; the approximate operating temperature range of the device; the decompression, decryption, or decoding capabilities of the device; the type of battery the device has; and the manufacturer and model of the device. Moreover, at 204, the device's current level of memory available may be determined. It should be appreciated that with respect to large volume downloadable content, mobile devices may have access to portable disk storage for storing large amounts of information for such downloads. Accordingly, the type of memory as well as the amount of the content to be downloaded may affect power consumption.

At 205, the impact on power consumption of possible decompression, decrypting, or decoding of selected content to be downloaded may be determined. At 206, a current power level of a mobile device may be obtained. At 207, the currently available bandwidth for communication with the mobile device as well as factors which may increase or decrease such bandwidth, such as day, time of day, and other historical data, may be obtained. At 208, a data rate or data rates and a duration of a download may be determined responsive to information obtained at 207 for user-selected content to be downloaded. Download duration, in addition to the data rate or rates, depends upon the size of the content to be downloaded. Notably, optionally, historical data obtained at 207 may be provided for a calculation at 209, or 207 may be done only sequentially with respect to operation 208.

At 209, information from 204, 205, 206, and 208 is obtained to determine whether or not there is sufficient battery power to complete a download, what the quality of service ("QoS") may be for each download scenario, and an associated price for each download scenario. Not all possible factors need be considered, as a margin for error may be added to any such calculation. Known formulations for battery power consumption may be used.

Notably, there may be multiple scenarios for downloading content, each of which may have an associated likelihood of success. Furthermore, each of these options may have an associated quality of service. For example, a compression technique which may degrade the information may be used for providing video content where it is known that, responsive to the model and manufacturer of the mobile device, the screen resolution is of a sufficiently low quality to warrant a lesser quality transmission. This may reduce the size of the content downloaded, thereby reducing the duration of the download. Furthermore, options having a lower quality of service or a lower likelihood of success, or a combination thereof, may be priced such that reduced likelihood of success or quality, or a combination thereof, may have a correspondingly reduced price.

At 211, download options determined at 209, along with pricing for each, as well as other information including likelihood of success and quality, may be sent to a user. Notably, there may be no download option other than to inform the user that it will be necessary to recharge or replace the battery in order to complete the download. Furthermore, it may be relayed to the user that there is no battery power sufficient for that particular mobile device and the selected content to be downloaded without fully depleting the power of the battery prior to completion of the download. Furthermore, it may be relayed to the user that memory limitations of the mobile device constrain the options, if any, for the download.

In response to information provided at 211, a user may select an option and make payment at 212 for downloading content. Responsive to the option selected and payment at 212, content may be downloaded at 213.

Figure 3:
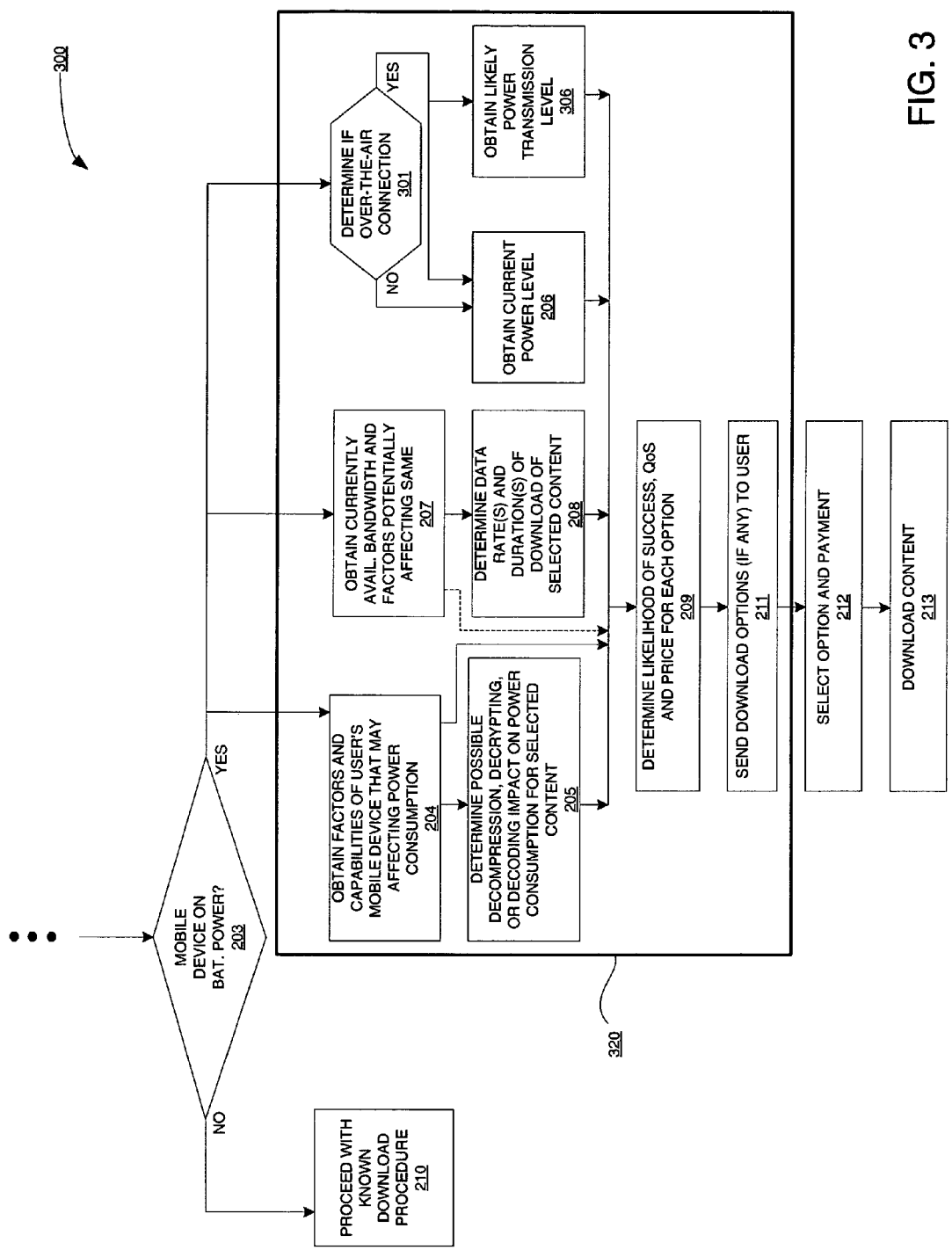
FIG. 3 is the flow diagram of FIG. 2 depicting additional operations relating to an over-the-air connection.

FIG. 3 is a flow diagram depicting an exemplary embodiment of a power consumption estimation for download flow 300. Flow 300 is the same as flow 200 except for the addition of operations 301 and 306 in power estimation routine 220 of FIG. 2 to provide a power estimation routine 320. Accordingly, for purposes of clarity, operations in power estimation routine 220 of FIG. 2 present in power estimation routine 320 of FIG. 3 are not described again.

If at 203 it is determined that a mobile device is on battery power, then at 301 it may be determined whether the mobile device is connected via an over-the-air connection, such as over-the-air connection 120 of FIG. 1. If the mobile device is connected via an over-the-air connection, then at 206 a current battery power level is obtained and at 306 a likely transmission power level for transmitting selected downloadable content is obtained. Information obtained at 206 and 306 is provided for operation 209.

If at 301 it is determined that a mobile device is not connected via an over-the-air connection, then at 206 a current battery power level is obtained as previously described with reference to FIG. 2.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for determining likelihood of download success responsive to user selection of downloadable content after establishment of a connection between a mobile device and a network, the method comprising:
   obtaining capabilities of the mobile device;
   obtaining the power level of the mobile device;
   determining at least one download data rate;
   the determining of the likelihood of download success being for downloading the downloadable content selected responsive to the at least one download data rate, the power level of the mobile device, and at least one capability from the capabilities of the mobile device;
   the determining of the likelihood of download success being completed before initiating the downloading;
   wherein the obtaining of the power level includes:
      reading the power level from a battery power monitor of the mobile device; and
      sending the power level read from the mobile device to a website;
   wherein the capabilities of the mobile device include at least one of decoding, decrypting, and decompressing; and
   wherein the obtaining of the capabilities of the mobile device includes:
      transmitting manufacture and model information of the mobile device to a base station; and
      cross-referencing the manufacture and model information against a database of mobile devices, the database of mobile devices including capabilities of mobile devices.

2. The method according to claim 1, wherein the obtaining of the power level further includes communicating the power level read to a base station and then to a digital network for access to the website.

3. The method according to claim 2, further comprising obtaining a transmission power level, the transmission power level associated with an over-the-air connection between the base station and the mobile device.

4. The method according to claim 3, wherein the transmission power level is a likely transmission power level for transmitting the downloadable content selected from the base station to the mobile device via the over-the-air connection.

5. The method according to claim 1, wherein the determining of the at least one download data rate includes determining a rate of data transmission to the mobile device for which the mobile device is configured to receive via an over-the-air connection.

6. The method according to claim 5, wherein the determining of the at least one download data rate includes scaling back the rate of data transmission responsive to a present bandwidth limitation.

7. The method according to claim 5, wherein the determining of the at least one download data rate includes scaling back the rate of data transmission responsive to an anticipated bandwidth limitation.

8. A method for determining likelihood of download success responsive to user selection of downloadable content after establishment of a connection between a mobile device and a network, the method comprising:
   obtaining capabilities of the mobile device;
   obtaining the power level of the mobile device;
   determining at least one download data rate;
   the determining of the likelihood of download success being for downloading the downloadable content selected responsive to the at least one download data rate, the power level of the mobile device, and at least one capability from the capabilities of the mobile device;
   the determining of the likelihood of download success being completed before initiating the downloading;
   obtaining battery information from the mobile device, the battery information associated with a battery of the mobile device;
   wherein the determining of the likelihood of download success includes being also responsive to the battery information, wherein the likelihood of download success is associated with a quality of service level; and
   sending a price associated with the quality of service level to the mobile device.

9. The method according to claim 8, wherein the likelihood of success is determined in part from a current power level of the battery.

10. The method according to claim 8, wherein the likelihood of success is determined in part from a size of the content selected.

11. The method according to claim 8, wherein the likelihood of success is determined in part from a form of the content selected.

12. The method according to claim 11, wherein the form of the content selected is encoded.

13. The method according to claim 11, wherein the form of the content selected is compressed.

14. The method according to claim 11, wherein the form of the content selected is encrypted.

* * * * *